United States Patent
Hendry et al.

(10) Patent No.: US 10,110,927 B2
(45) Date of Patent: Oct. 23, 2018

(54) VIDEO PROCESSING MODE SWITCHING

(71) Applicant: Apple Inc., Cupertino, CA (US)

(72) Inventors: Ian C. Hendry, San Jose, CA (US);
Kenneth Christian Dyke, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1227 days.

(21) Appl. No.: 13/955,443

(22) Filed: Jul. 31, 2013

(65) Prior Publication Data

US 2015/0036734 A1    Feb. 5, 2015

(51) Int. Cl.
*H04N 7/12* (2006.01)
*H04N 19/85* (2014.01)
*H04N 19/436* (2014.01)

(52) U.S. Cl.
CPC ........... *H04N 19/85* (2014.11); *H04N 19/436* (2014.11)

(58) Field of Classification Search
CPC .............................. H04N 19/85; H04N 19/436
USPC .................................................... 375/240.02
See application file for complete search history.

(56) References Cited

U.S. PATENT DOCUMENTS

| | | | |
|---|---|---|---|
| 6,791,538 B2 | 9/2004 | Van Vugt | |
| 8,019,883 B1 | 9/2011 | Margulis | |
| 8,072,443 B2 | 12/2011 | Vasquez et al. | |
| 8,310,491 B2 | 11/2012 | Swift et al. | |
| 2004/0075670 A1* | 4/2004 | Bezine | H04N 5/44504 345/619 |
| 2005/0162436 A1* | 7/2005 | Van Hook | G06T 15/005 345/546 |
| 2006/0066504 A1 | 3/2006 | Sampsell et al. | |

* cited by examiner

*Primary Examiner* — Allen Wong
(74) *Attorney, Agent, or Firm* — Robert C. Kowert; Meyertons, Hood, Kivlin, Kowert & Goetzel, P.C.

(57) ABSTRACT

Methods and apparatus for switching between different video processing modes in an apparatus. In a first mode, minimal processing of the video frames may be performed by the apparatus prior to feeding the frames to a display controller. In a second mode, the apparatus may perform additional rendering of the video frames including compositing of other graphical input with the rendered video frames to generate display frames that may be fed to the display controller. To conserve power, the apparatus may operate in or switch to the first mode when the additional rendering and compositing is not required or when the device is in a low power mode, and operate in or switch to the second mode when the additional rendering and compositing is required to render desired graphical effects.

20 Claims, 6 Drawing Sheets

VIDEO PROCESSING MODE SWITCHING

BACKGROUND

Technical Field

This disclosure relates generally to processing video input for display, and more specifically to methods for switching between different video processing pipelines or modes.

Description of the Related Art

Various computing devices including but not limited to personal computer systems, desktop computer systems, laptop and notebook computers, tablet or pad devices, and mobile phones or smart phones may include an apparatus (e.g., an integrated circuit (IC), such as a system-on-a-chip (SOC), or a package such as a multi-chip module (MCM)), as well as software such as drivers that program or control the hardware, that may receive and process video input from one or more sources and output the processed video to one or more displays. In addition, other graphical input (e.g., graphical user interface (GUI) elements) may be processed and output to the displays. A display to which the processed graphical information is output may be integrated in the computing device or external to the computing device. The apparatus may include multiple functional blocks or units, as well as external interfaces to, for example, external memory, video input sources, and display(s). Typically, the blocks include a display controller that includes one or more display pipelines that each may render graphical input and send the rendered graphical information to a separate display. In addition, the apparatus may include one or more blocks such as video decoders and processors including but not limited to graphics processing units (GPUs) that may be used to perform at least some processing/rendering of the graphical input (e.g., video frames), such as format conversion, window compositing, blending, scaling, and/or color correction, before sending the graphical information (e.g., at least partially processed video frames) to a display pipeline of the display controller for output to a display.

Typically, raw video is received in a format that is not directly compatible with the display device. In addition, the display controller may not accept the raw video format as input. For example, a common video format is 1080p (1920×1080 pixels, 2.1 megapixels) encoded in YUV420. However, display devices generally expect RGB input, which is typically four bytes per pixel with three color channels (red, green, blue) and one alpha channel. In addition, screen size in pixels of the display device may be larger than the video format, for example 2880×1800 pixels. Many display controllers may accept video frames in RGB or YUV422 encoding, but not in YUV420 encoding. Thus, generally, at least some processing of input video is performed by the apparatus to convert the video input into a display-compatible format before outputting the video frames to the display device for display.

SUMMARY OF EMBODIMENTS

Various embodiments of methods and apparatus for seamlessly switching between different video processing pipelines or modes in computing devices are described. In embodiments, an apparatus (e.g., an integrated circuit (IC) or a package such as a multi-chip module (MCM)) of the device may support at least two video processing modes. In a first video processing mode, minimal processing of the video frames may be performed by functional blocks or units of the apparatus (e.g., decoders, GPUs, etc.) prior to feeding the frames to a display pipeline of a display controller. In a second video processing mode, blocks of the apparatus (e.g., decoders, GPUs, etc.) may perform additional rendering (e.g., format conversion and scaling) of the video frames, and may also perform compositing of other graphical input with the rendered video frames, to generate display frames that are ready or nearly ready for display; the display frames may then be fed to the display controller.

In at least some embodiments of a method for seamlessly switching between the video processing modes, a mode switch may be performed upon receiving additional graphical input to be composited with the video frames or upon determining that only the video stream needs to be updated on the display device. As another example, a mode switch may be performed upon detecting a low power condition or mode on the device that includes the apparatus. The switching between the modes may be performed between two consecutive frames or display screen updates and thus on a frame boundary. In at least some embodiments, the rendering performed by the blocks of the apparatus to generate the display frames in the second mode may be programmed to closely or identically match the rendering performed by the display controller in the first mode so that visible artifacts are not displayed to the display device. Similarly, the rendering performed by the display controller to generate the display frames when the apparatus is operating in the first mode may be programmed to closely or identically match the rendering performed by the blocks of the apparatus when the apparatus is operating in the second mode.

Embodiments of the second video processing mode may, for example, be able to generate graphical effects for composited windows that cannot be achieved using the display controller in the first mode, and thus may be used when those graphical effects are desired. However, embodiments of the first video processing mode may generally use less power than embodiments of the second mode, as the rendering performed by the blocks of the apparatus in the second video processing mode may use considerable memory to buffer frames during the rendering, and memory accesses may use more power than would be used by the display controller in performing similar rendering tasks. Thus, embodiments of the switching method that enables the apparatus to change the video processing mode being used in response to certain events may, for example, provide power savings in the computing device, as the first mode can be used to process input video for display when additional rendering of the second video processing mode is not necessary, for example when only the video input is being rendered for display, and the apparatus can switch to the second mode when the additional rendering of the second video processing mode is necessary or desired, for example when visual effects for graphical user interface (GUI) elements or other graphical elements are to be composited with the rendered video frames.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 5:
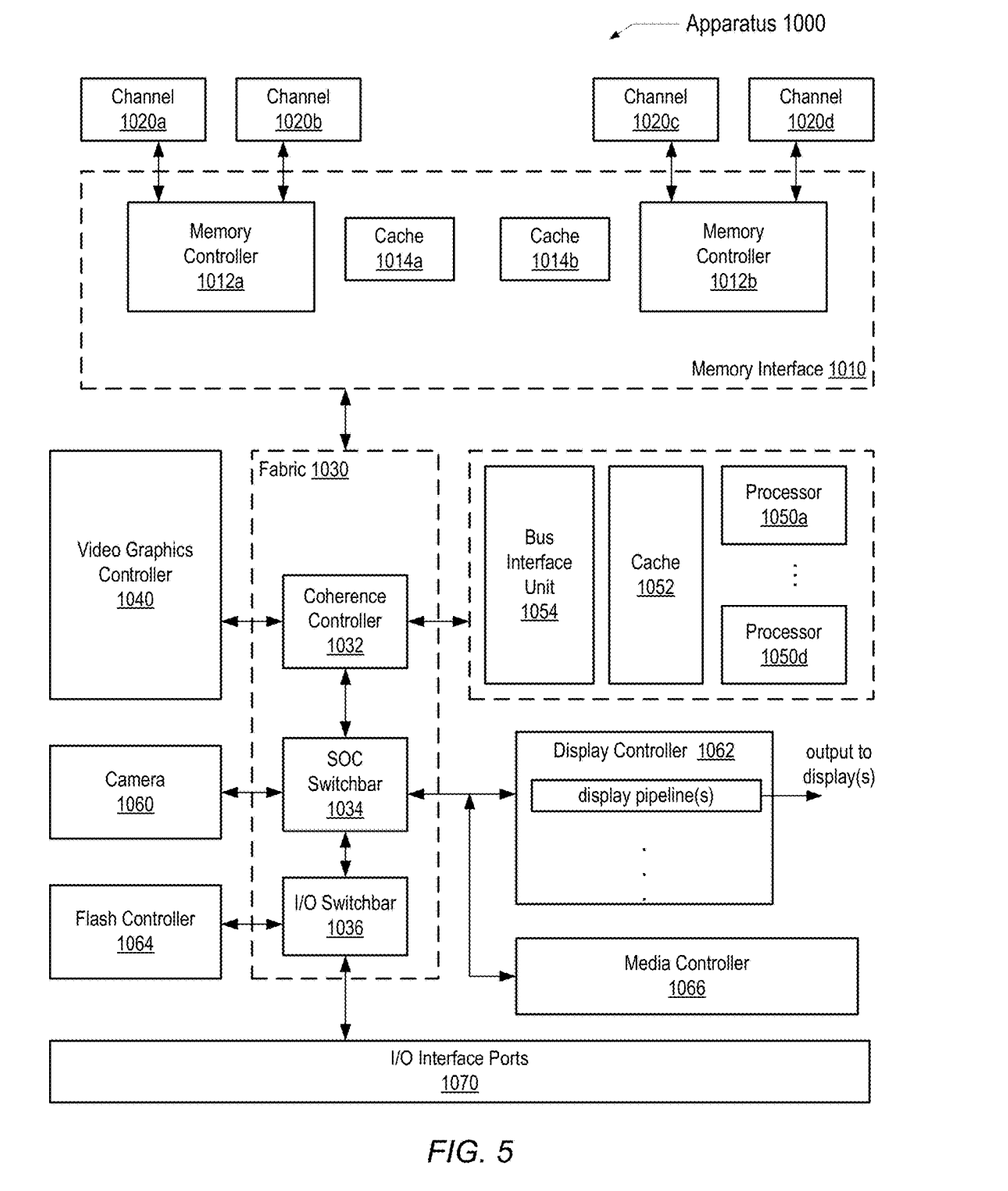
FIG. 5 is a generalized block diagram illustrating an example embodiment of an apparatus in which embodiments of multiple video processing modes and embodiments of a method for switching between video processing modes may be implemented.

Various embodiments of methods and apparatus for seamlessly switching between different video processing pipelines or modes in computing devices are described. FIG. 5 shows a non-limiting example of an apparatus in which embodiments of the video processing modes and the switching method may be implemented. In embodiments, the apparatus (e.g., an integrated circuit (IC), such as a system-on-a-chip (SOC), or a package such as a multi-chip module (MCM)) of the device may support at least two video processing modes. In a first video processing mode, minimal processing of the video frames may be performed by functional blocks or units of the apparatus (e.g., decoders, GPUs, etc.) prior to feeding the frames to a display pipeline of a display controller. In a second video processing mode, blocks of the apparatus (e.g., decoders, GPUs, etc.) may perform additional rendering (e.g., format conversion and scaling) of the video frames, and may also perform compositing of other graphical input with the rendered video frames, to generate display frames that are ready or nearly ready for display; the display frames may then be fed to the display controller. Embodiments of a method for seamlessly switching between video processing modes are also described. For example, a mode switch may be performed upon receiving additional graphical input to be composited with the video frames or upon determining that only the video stream needs to be updated on the display device. The switching between the modes may be performed between two consecutive frames or display screen updates and thus on a frame boundary. In at least some embodiments, the rendering performed by the blocks of the apparatus to generate the display frames in the second mode may be programmed to closely or identically match the rendering performed by the display controller in the first mode so that visible artifacts are not displayed to the display device. Similarly, the rendering performed by the display controller to generate the display frames when the apparatus is operating in the first mode may be programmed to closely or identically match the rendering performed by the blocks of the apparatus when the apparatus is operating in the second mode.

Typically, raw video is received by an apparatus (e.g., an integrated circuit (IC), such as a system-on-a-chip (SOC), or a package such as a multi-chip module (MCM)) of a computing device in a format that is not directly compatible with the display device to which a display controller of the apparatus outputs frames to be displayed. In addition, the display controller may not accept the raw video format as input. Thus, at least some processing of input video may be performed by the apparatus to convert the video input into a display-compatible format before outputting the video frames to the display device for display. For example, the one or more blocks of the apparatus (e.g., decoders, GPUs, etc.) may be used to convert the video input from a raw video format (e.g., YUV420/1080p) to display (e.g., RGB) format frames of an appropriate size for display prior to feeding the video frames to the display controller. The display controller may perform additional rendering of the frames prior to feeding the frames to the display device.

However, converting the video input from the raw video format to the display-compatible format using the decoders, processors, GPUs, and other blocks of the apparatus prior to sending the rendered frames to the display controller is a memory-intensive operation, as each frame must be buffered to memory one or more times in one or more formats during the conversion, and many frames (e.g., 24, 30, or 60 frames) are processed each second, with the number processed depending on the frame rate of the video. Note also that RGB format frames tend to be considerably larger than YUV420/1080p format frames due to the fact that RGB uses more bytes to encode each pixel. In addition, the frames may need to be scaled up for output to the display, further increasing the size of the frames that are buffered to memory and thus the memory usage. Memory usage by the apparatus tends to consume a lot of power, and in many computing devices, for example battery-powered devices, conserving power is an important consideration.

However, at least some display controllers that may be used in the apparatus may accept video frames in an intermediate video format, such as YUV422 encoded video frames. Thus, as an alternative to having the decoders, processors, GPUs, scaler units, etc. of the apparatus render the frames for display before feeding the rendered RGB frame to the display controller, which tends to make a lot of use of memory and thus tends to consume a lot of power, the apparatus may instead convert the video input from a raw video format (e.g., YUV420/1080p format) to an intermediate format (e.g., YUV422 format) and feed the video frames in the intermediate format to a display pipeline of the display controller. The display controller may then perform further processing of the video frames to convert the frames into display (e.g., RGB) format frames and scale the frames to an appropriate size, if necessary, for display. In many computing devices, this alternative method may result in power savings as the display controller may be specifically designed to perform the rendering tasks more efficiently than can be done using the other blocks of the apparatus such as GPUs.

Thus, there may be different video processing modes that may be implemented in the apparatus to process raw video input into a format appropriate for display.

In addition, there may be other graphical content, for example user interface graphics or objects, that may be input to the apparatus for processing and displaying to the display device. One or more video input streams and one or more of these other graphical input sources may be input for display concurrently. For example, a user may be watching a video on the computing device, and the operating system (OS) of the computing device or an application on the device may during the video generate a notification or other user interface element that needs to be displayed to the display device. Thus, in addition to video processing, another function that may be performed by the apparatus is combining these different graphical inputs (e.g., a video stream and one or more GUI elements) into output frames to be displayed on the display device. This function may be referred to herein as window compositing.

At least some display controllers that may be used in an apparatus such as an IC or MCM may support compositing of different graphical inputs or "windows". For example, a display controller may include one or more video pixel processing pipelines that each process video input and one or more user interface (UI) pixel processing pipelines that each process UI input; output of these two pipelines may be fed into a blending component that combines the inputs into display frames for output to the display device. However, the resulting composited output of at least some such display controllers may not be visually satisfactory. In addition, some visual effects that the developers of a computing device and/or operating system want to implement for the user interface may not be supported by the display controller used in the IC or SOC used in the device. Thus, it may be necessary or desirable to perform the window compositing on the apparatus prior to feeding the rendered display frames to the display controller. However, this requires the raw video input to be converted to the display-compatible format (e.g., RGB) and appropriate display size, which as previously noted requires considerable memory usage for the frame buffers and thus consumes considerable power.

Thus, in embodiments, an apparatus (e.g., an integrated circuit (IC), such as a system-on-a-chip (SOC), or a package such as a multi-chip module (MCM)) of the device may support at least two video processing modes. FIG. 5 shows a non-limiting example of an apparatus in which embodiments of the video processing modes may be implemented. In a first video processing mode, minimal processing of the video frames may be performed by functional blocks or units of the apparatus (e.g., decoders, GPUs, etc.) prior to feeding the frames to a display pipeline of a display controller; the display pipeline performs additional processing, including but not limited to scaling and conversion to a format compatible with the display device, to complete the rendering of the frames into display frames suitable for output to the display device. For example, the decoder may convert the video frames from a raw video format (e.g., YUV420/1080p format) into an intermediate video format (e.g., YUV422 format) accepted by the display controller, and feed the intermediate video format frames to a display pipeline of the display controller. The display pipeline may then render display frames (e.g., RGB frames) of the appropriate size that include at least the video frame content. In a second video processing mode, blocks of the apparatus (e.g., decoders, GPUs, etc.) may perform additional rendering of the video frames, and may also perform compositing of other graphical input with the rendered video frames, to generate display frames that are ready or nearly ready for display; the display frames may then be fed to the display controller, which may but does not necessarily perform additional processing of the display frames, and writes the display frames out to the display device.

In embodiments, the apparatus also implements an embodiment of a method for seamlessly switching between video processing modes, for example upon receiving additional graphical input to be composited with the video frames in each display frame or upon determining that only the video stream needs to be updated on the display device. In at least some embodiments, the switching between the video processing modes may be performed between two consecutive frames or display screen updates and thus on a frame boundary. In at least some embodiments, the rendering performed by the blocks of the apparatus to generate the display frames in the second mode may be implemented so as to closely or identically match the rendering performed by the display controller in the first mode so that visible artifacts are not displayed to the display device.

Embodiments of the first video processing mode may generally use less power than embodiments of the second mode, as the rendering performed by the blocks of the apparatus in the second video processing mode may use considerable memory to buffer frames during the rendering, and memory accesses tend to use considerable power. Thus, embodiments of the switching method that enables the apparatus to change the video processing mode being used in response to certain events may, for example, provide power savings in the computing device, as the first mode can be used to process input video for display when the additional rendering of the second video processing mode is not necessary, for example when only the video input is being rendered for display, and the apparatus can switch to the second mode when the additional rendering of the second video processing mode is necessary or desired, for example when visual effects for graphical user interface (GUI) elements or other graphical elements are to be composited with the rendered video frames.

Figures 1A, 1B:
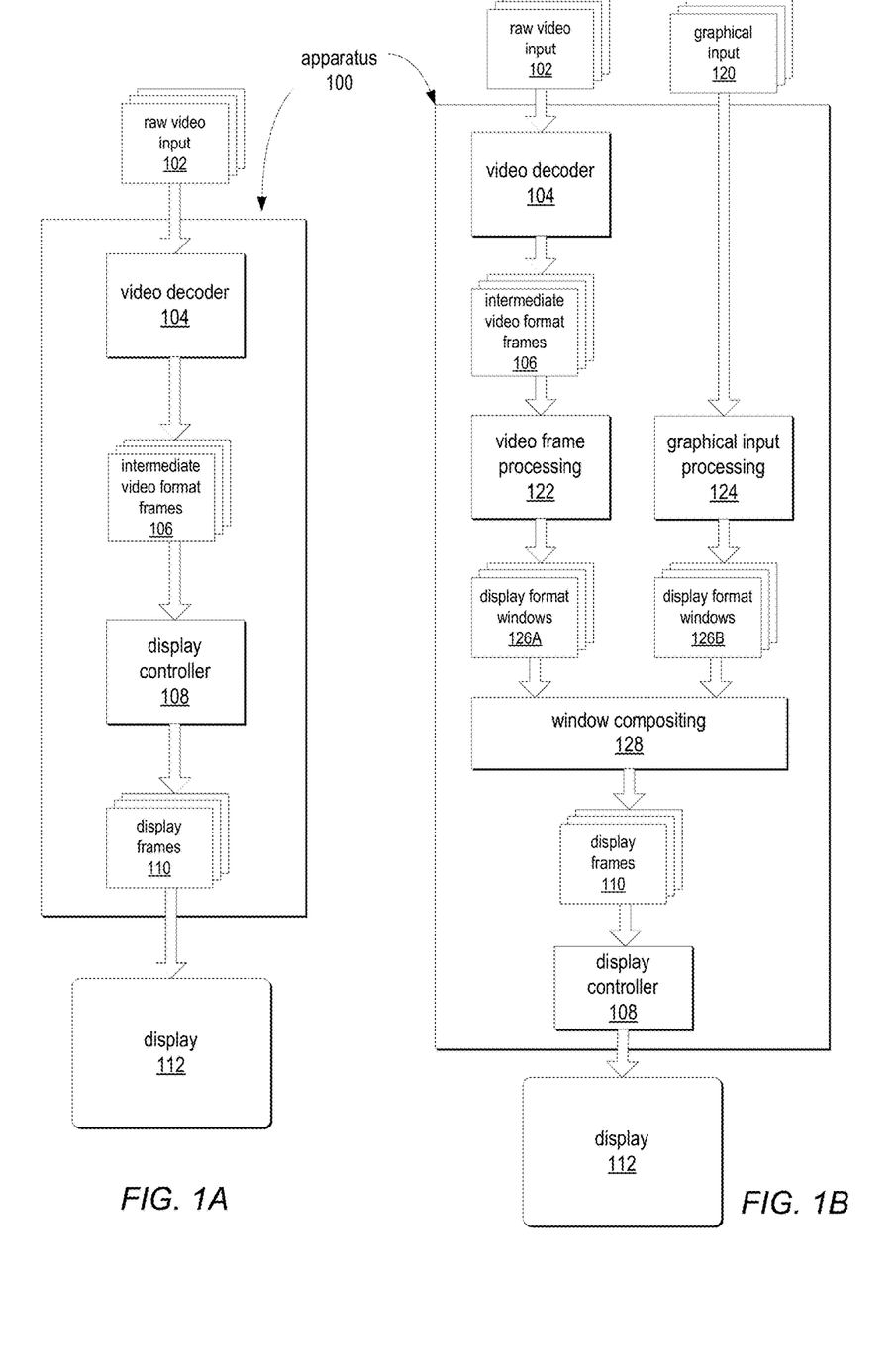
FIG. 1A shows an example embodiment of a first video processing mode in example apparatus, according to at least some embodiments.
FIG. 1B shows an example embodiment of a second video processing mode in example apparatus, according to at least some embodiments.

FIGS. 1A and 1B illustrate data flow in example video processing modes in an example apparatus 100 in a computing device, according to at least some embodiments, and are not intended to be limiting.

FIG. 1A shows an example embodiment of a first video processing mode in example apparatus 100, according to at least some embodiments. Raw video input 102 may be received from an external video source. For example, the raw video input 102 may be a YUV420/1080p format video stream. A video decoder 104 of apparatus 100 may decode the video input 102 to generate intermediate video format frames 106. For example, the decoder may convert the video frames from a raw video format (e.g., YUV420/1080p format) into an intermediate video format (e.g., YUV422 format) accepted by the display controller 108. The frames 106 may be buffered into internal memory of component 100 such as an on-chip cache memory and/or to memory of the device external to the component 100 such as off-chip dynamic random access memory (DRAM). The intermediate video format frames 106 may then be fed into or read by the display controller 108. A display pipeline of the display controller may then perform additional processing, including but not limited to conversion of the video frames to a format compatible with the display device, for example RGB format, and scaling to an appropriate size for the display 112 to complete the rendering of the frames into display frames 110 suitable for output to the display 112 device. Note that, in at least some embodiments, some additional processing may be performed on the frames 106 prior to feeding the frames 106 into display controller 108. Also note that other graphical input may also be fed into or read by display controller 108, processed in another display pipeline into display format, and composited or blended by the display controller 108 with the rendered video content to generate display frames 110.

FIG. 1B shows an example embodiment of a second video processing mode in example apparatus 100, according to at least some embodiments. Raw video input 102 may be received from an external video source. For example, the raw video input 102 may be a YUV420/1080p format video stream. A video decoder 104 of apparatus 100 may decode the video input 102 to generate intermediate video format frames 106. For example, the decoder may convert the video frames from a raw video format (e.g., YUV420/1080p format) into an intermediate video format (e.g., YUV422 format) accepted by the display controller 108. The frames 106 may be buffered to internal memory of component 100 such as an on-chip cache memory and/or to memory of the device external to the component 100 such as off-chip dynamic random access memory (DRAM).

As shown by video frame processing 122, the buffered frames 106 may be further processed by one or more blocks of the apparatus 100. For example, format conversion and/or scaling may be applied to each frame 106 to generate display format windows 126A that are in a color format (e.g., RGB) and of a size appropriate for display. Display format windows 126A may be buffered to internal memory of component 100 and/or to memory of the device external to the component 100. In some embodiments, other processing functions may instead or also be performed on the image information in the frames, for example color correction and/or gamma correction may be performed.

In addition to raw video input 102, other graphical input 120 may also be received from one or more sources. For example, an operating system of the device or an application on the device may generate graphical user interface (GUI) content that is to be displayed to the display device 112. Note that at least a portion of graphical input 120, when rendered and displayed, may overlap the rendered and displayed video. Graphical input processing 124 may be performed on the graphical input 120 by one or more blocks of the apparatus 100, generating display format windows 126B, which also may be buffered to internal memory of component 100 and/or to memory of the device external to the component 100.

Figure 2:
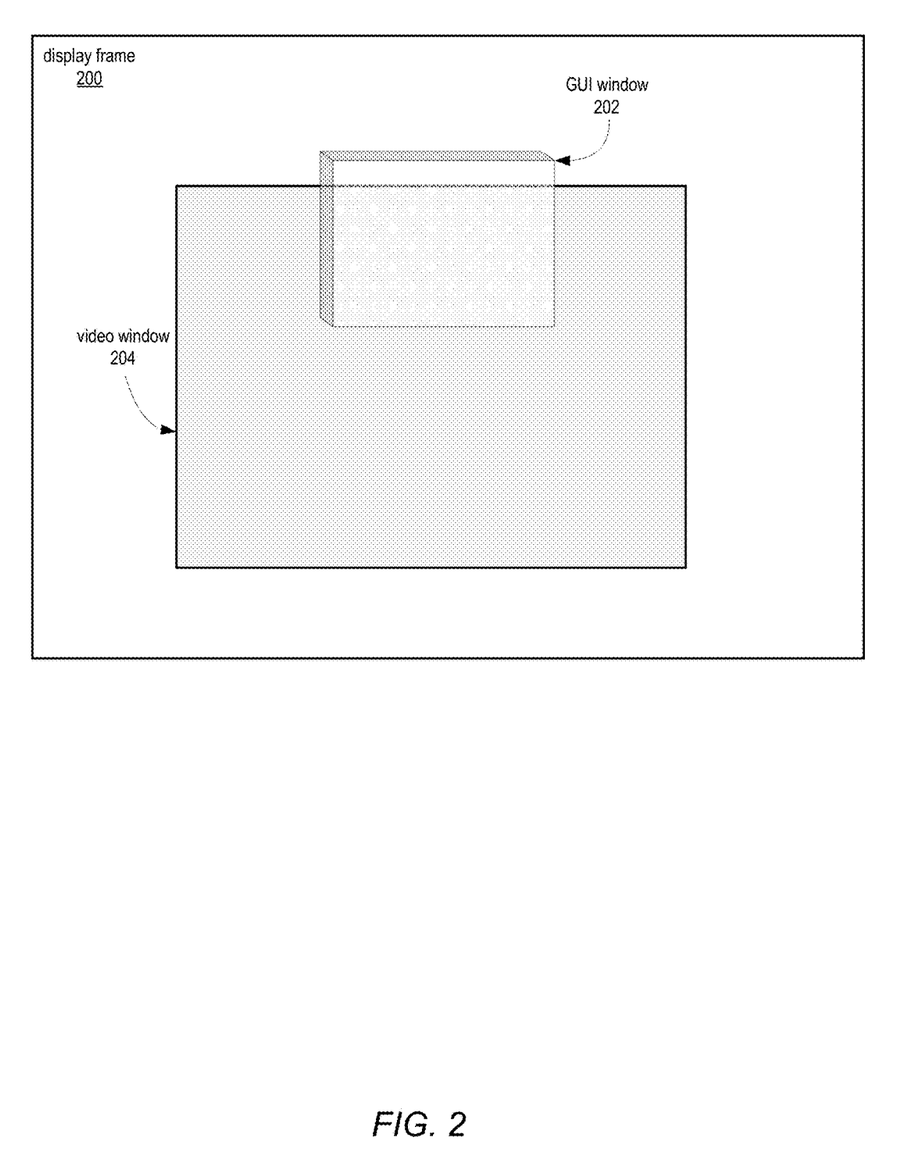
FIG. 2 shows an example of compositing a graphical user interface (GUI) window with a video window in a display frame

For each display frame 110 to be written to the display device 112, one or more blocks of the apparatus 100 may be used to perform a window compositing 128 process or function. In window compositing, two or more windows of graphical content are combined, placed, overlaid, and/or blended to generate a display frame 110. For example, a display format window 126A of the video steam, which contains one at least partially rendered frame of the video stream, may be composited with at least one display format window 126B containing other graphical content such as a GUI element. In at least some embodiments, window compositing 128 may apply various graphical effects when compositing, such as transparency and shadowing. FIG. 2 shows a simple and non-limiting example of a GUI window 202 that is composited with a video window 204 in a display frame 200. The GUI window 202 in this example has been composited in display frame 200 partially overlapping video window 204 and using a transparency effect and a shadowing effect.

The display frames 110 may then be fed into or read by the display controller 108. A display pipeline of the display controller may then perform additional processing on display frames 110, if necessary, and output the frames 110 to the display 112 device.

Note that video frame processing 122 and window compositing 128 tend to use a significant amount of power as the processing functions performed by each may often write to and read from memory when working on each frame, and as noted memory accesses tend to be power-expensive.

As an alternative to the video processing mode or pipeline shown in FIG. 1B, in some embodiments, instead of performing window compositing 128 on blocks of the apparatus 100 as shown in FIG. 1B, display format windows 126A and 126B may be fed into different display pipelines of display controller 108. The display pipelines may perform additional processing on display format windows 126A and/or display format windows 126B. Output of the display pipelines may then be composited or blended by the display controller 108 to generate display frames 110.

Video Processing Mode Switching

Figure 3:
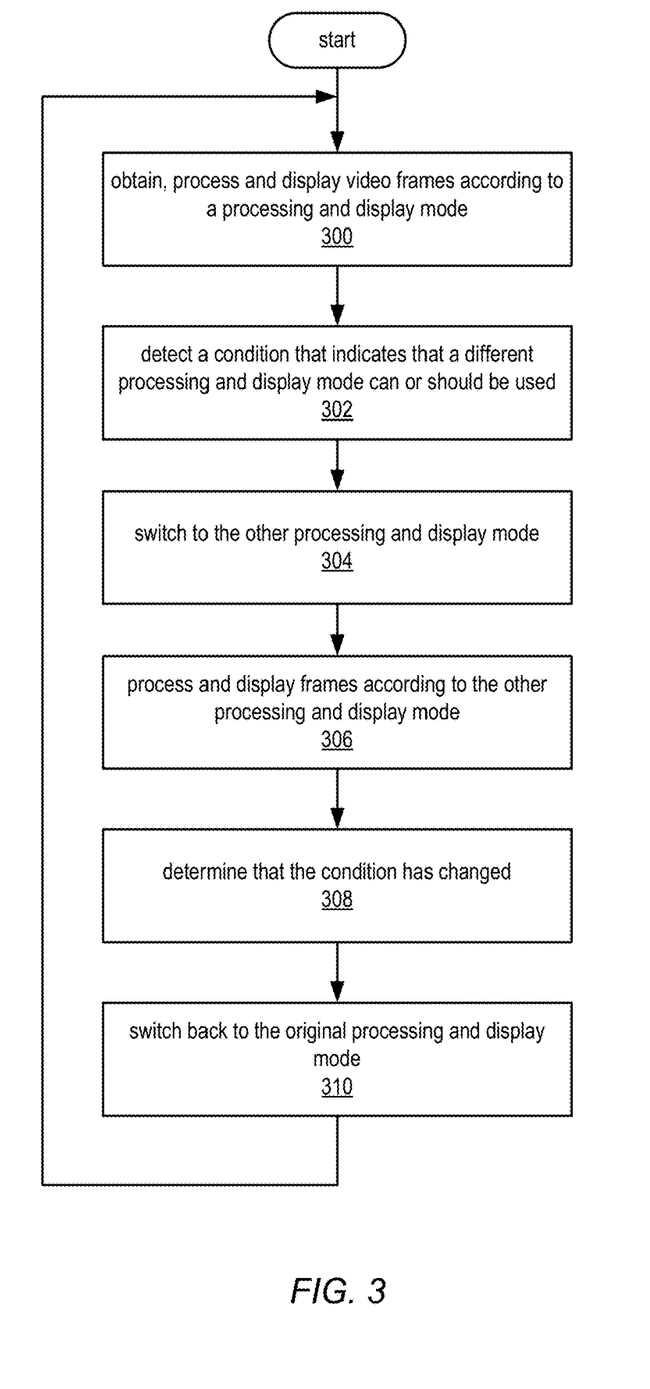
FIG. 3 is a high level flowchart of a method for mode switching between processing and display modes on an example apparatus, according to at least some embodiments.
Figure 4:
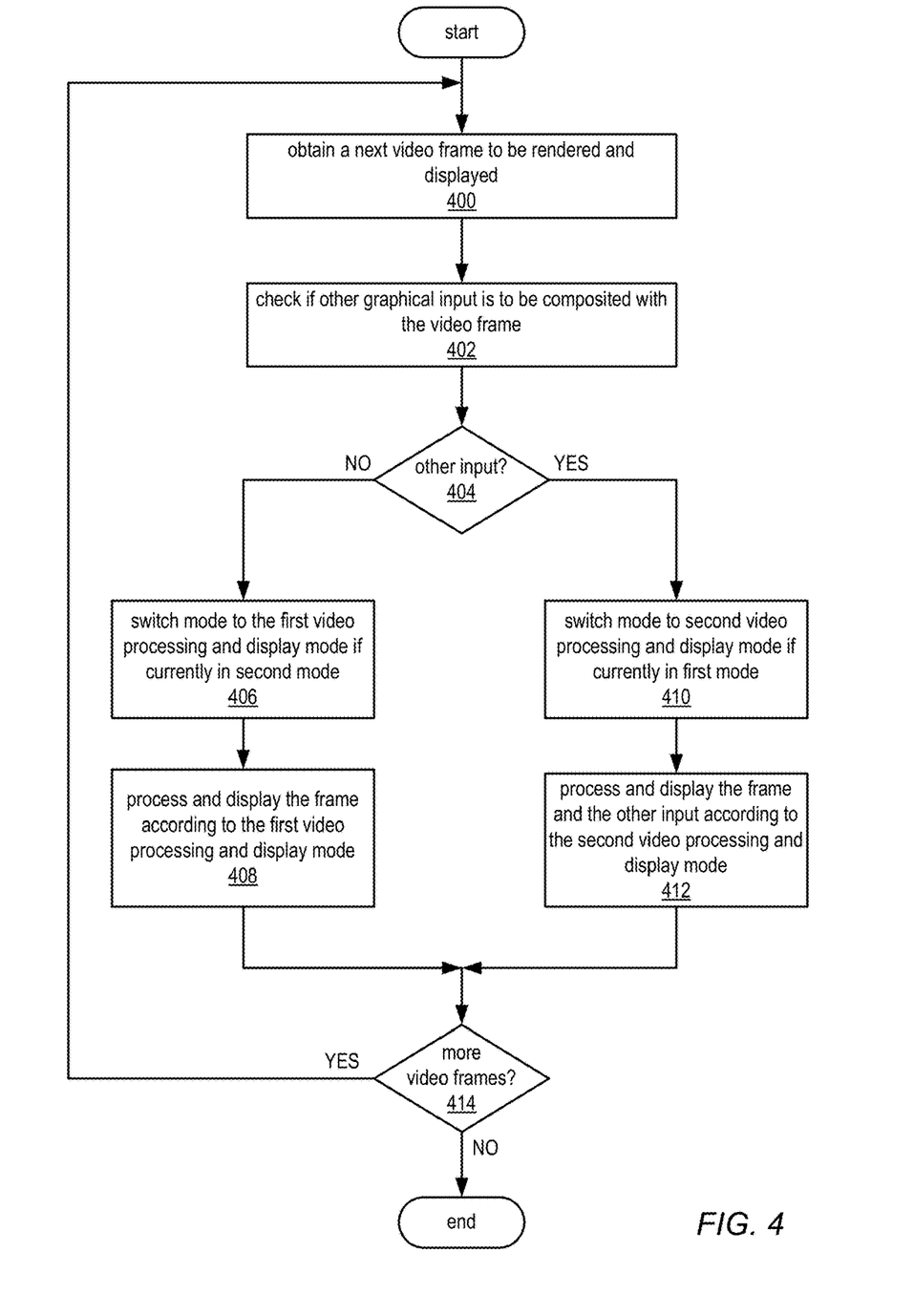
FIG. 4 is flowchart of a method for rendering and displaying vide frames in which mode switching between first and second processing and display modes is performed on a frame boundary, according to at least some embodiments.

Embodiments of an apparatus such as the example apparatus illustrated in FIG. 5 may implement a method for seamlessly switching between video processing modes, for example the first and second video processing modes as illustrated in FIGS. 1A and 1B. FIGS. 3 and 4 are flowcharts that illustrate methods for switching between different video processing pipelines or modes in computing devices, according to at least some embodiments. Note that the methods shown in FIGS. 3 and 4 are given by way of example, and are not intended to be limiting.

FIG. 3 is a high level flowchart of a method for mode switching between processing and display modes on an example apparatus 100, according to at least some embodiments. An apparatus 100 may begin receiving a video sequence or stream to be displayed to a display device coupled to a display controller 108 coupled to or integrated with the apparatus 100. (Note that the method of FIG. 3 may continue until all frames in the video stream have been processed and displayed). As indicated at 300, the apparatus 100 may obtain, process, and display video frames in the video stream according to a processing and display mode. The video frames may, for example, be frames in a video stream being captured by a video-capable imaging device coupled to or integrated with the computing device that includes the apparatus 100. As another example, the video frames may be from a video previously stored to memory of the computing device. As another example, the video frames may be from a video being read from a memory media device (e.g., a CD or DVD reader) integrated with or attached to the computing device. As another example, the video frames may be in a video stream received by the computing device via a wired or wireless network connection, for example a video being played back from a web site or other network location.

The processing and display mode used to process and display the video frames may be either an embodiment of a first video processing mode as illustrated in FIG. 1A or an embodiment of a second video processing mode as illustrated in FIG. 1B. For example, upon first obtaining one or more frames of a video stream to be processed, the apparatus 100 may determine which of the two video processing modes should be used. For example, if the display is to be updated only with the content of the video frames, the apparatus 100 may initially process and display the video frames according to the first video processing mode, which saves power as the processing of the frames prior to feeding them to the display controller 108 requires fewer and smaller buffers in memory and thus fewer memory reads and writes are required. Alternatively, if the apparatus 100 is also receiving additional graphical content that needs to be composited with the video frames, the apparatus 100 may initially process and display the video frames according to the second video processing mode. In at least some embodiments, the determining of which video processing mode to use may be performed by a controller and/or driver software of the apparatus, which collectively may be referred to as an apparatus controller.

As indicated at 302, the apparatus 100 may detect a condition that indicates that a different processing and display mode can or should be used. As indicated at 304, in response to the detected condition, the apparatus 100 may switch to the other processing and display mode. For example, if the mode currently in use is the first video processing mode, the apparatus 100 may receive graphical input from the operating system or from an application on the computing device (e.g., a notification window) that needs to be composited with the video frames. The apparatus 100 may then switch from the first video processing mode to the second video processing mode so that the new graphical input can be appropriately composited with the video frame(s) by the functional blocks of the apparatus prior to feeding the frames to be displayed to the display controller 108. As another example, if the mode currently in use is the second video processing mode, the apparatus 100 may determine that there is currently no additional graphics input that needs to be composited with the video frames. Alternatively, a low power condition may be detected. The apparatus 100 may then switch from the second video processing mode to the first video processing mode in which less processing of the video frames is performed prior to feeding the frames to the display controller 108 to save power.

In at least some embodiments, the detection and switching of elements 302 and 304 may be performed by the apparatus controller of the apparatus 100. Note that the detection and switching of elements 302 and 304 may be performed by the apparatus controller on a frame boundary between two consecutive frames of the input video. In at least some embodiments, switching to the appropriate processing and display mode at 302 may involve the apparatus controller directing one or more blocks of the apparatus 100 to change the current mode of operation. Switching at 302 may also involve the apparatus controller directing the display controller 108 to change its mode of operation. For example, when switching from the second video processing mode to the first video processing mode, the apparatus controller may direct the display controller 108 by providing one or more of formatting, sizing, color correction, and gamma correction instructions and/or parameters, and any other necessary instructions and/or parameters needed for the display controller 108 to correctly render the frames.

As indicated at 306, after switching the processing and display mode at 304, the apparatus 100 may process and display one or more frames of the video stream according to the current processing and display mode. This processing and displaying according to the current processing and display mode may continue until the apparatus controller determines that the condition detected at 302 has changed, as indicated at 308. As indicated at 310, in response to the determination at 308, the apparatus controller may then cause the apparatus 100 to switch back to the original processing and display mode. For example, if the apparatus is currently using the second video processing mode, the apparatus controller may determine that there is no longer graphical content to be composited with the video frames at 308, and switch the apparatus 100 back to the first video processing mode to save power. As another example, if the apparatus is currently using the first video processing mode, the apparatus may detect at 308 that graphical input has been received that needs to be composited with the video frames, and switch the apparatus 100 back to the second video processing mode so that the video frames and graphical content can be appropriately composited and otherwise rendered by the blocks of the apparatus prior to feeding the display frames to the display controller, 108.

The method as illustrated in FIG. 3 may allow the apparatus to save power by switching back and forth between the first and second video processing modes in response to events, while also allowing the displayed output to be visually as good as possible. When minimal work can be done on the video frames by the apparatus 100 prior to feeding the frames to the display controller 108 (e.g., only decoding and conversion to YUV422 encoding), the apparatus 100 can operate in the first video processing mode to save power, as the blocks of the apparatus 100 operating in the first mode require fewer and smaller memory buffers and thus require fewer reads and writes to memory than in the second mode. In addition, the display controller 108 can generally perform the necessary rendering (scaling, format conversion, etc.) of the frames prior to display more efficiently than can be done by the blocks of the apparatus. However, when the frames need to be composited with other graphical input and the display controller 108 cannot sufficiently perform the necessary rendering to achieve desired visual effects such as transparency and shadowing, the apparatus 100 can be seamlessly switched, on a frame boundary, to the second video processing mode where the necessary rendering tasks (scaling, format conversion, etc.) to appropriately composite the video frames with other graphical input are performed by the apparatus 100 prior to feeding the at least partially rendered display frames to the display controller 108.

FIG. 4 is flowchart of a method for rendering and displaying video frames in which switching between a first and second processing and display modes is performed on a frame boundary, according to at least some embodiments. Example first and second video processing modes that may be used in an apparatus 100 to process and display the frames in the video stream are illustrated in FIGS. 1A and 1B, respectively. The apparatus 100 may begin receiving a video sequence or stream to be displayed to a display device coupled to a display controller 108 coupled to or integrated with the apparatus 100. As indicated at 400, a next video frame to be rendered and displayed may be obtained or received by the apparatus 100. As indicated at 402, an apparatus controller of the apparatus 100 may check to determine if other graphical input is to be composited with the video frame.

At 404, if there is currently no other graphical input to be composited with the video frame, then the method may proceed to element 406. As indicated at 406, if the apparatus 100 is currently in the second video processing mode, then the apparatus controller may direct the blocks of the apparatus 100 and the display controller 108 to switch to the first video processing mode. As indicated at 408, the apparatus 100 may process and display the video frame according to the first video processing mode, for example as illustrated in FIG. 1A. For example, a video decoder 104 component of the apparatus 100 may decide the video frame(s) into an intermediate video format (e.g., YUV422 encoding format), and the decoded intermediate video format frames may be buffered for input to the display controller 108. The display controller 108 may perform additional format conversion(s), scaling, and other necessary rendering functions to prepare and buffer display frame(s) 110 for output to a display 112 device.

At 404, if there is other graphical input to be composited with the video frame (e.g., a notification window), then the method may proceed to element 410. As indicated at 410, if the apparatus 100 is currently in the first video processing mode, then the apparatus controller may direct the blocks of the apparatus 100 and the display controller 108 to switch to the second video processing mode. As indicated at 412, the apparatus 100 may process and display the video frame according to the second video processing mode, for example as illustrated in FIG. 1B. For example, a video decoder 104 component of the apparatus 100 may decide the video frame(s) into an intermediate video format (e.g., YUV422 encoding format), and the decoded intermediate video format frames may be buffered for further video frame processing 112 to be performed by one or more blocks of the apparatus 100. The blocks may perform the video frame processing 112 to generate display format windows 126A, which may be buffered for window compositing 128 with windows 126B containing other graphical input to be performed by one or more blocks of the apparatus 100. Window compositing 128 may buffer output display frames 110 for input to the display controller 108. Note that the display controller 108 may perform additional processing of the display frames 110 if necessary prior to feeding the final display frames to the display 112 device.

At 414, if there are more video frames in the video stream to be processed and displayed, then the method may return to element 400 to obtain and process the next frame. Otherwise, the method is done until another video stream needs to be processed and displayed.

Note that the methods shown in FIGS. 3 and 4 may continuously process incoming video frames from the video stream for display according to the frame rate of the video stream, and one or more frames in the video stream may be in the process of being rendered for display according to each of the two modes at any given time. For example, one or more intermediate video format frames 106 may have been processed, or the processing of the frames may be in progress, according to the first video processing mode when the mode is switched to the second video processing mode. The processed frames may be buffered as intermediate video format frames 106 for input to and processing by the display controller 108. The apparatus 100 may begin processing incoming frames according to the second mode, and may buffer the rendered display frames 110 for input to the display controller 108. Thus, the display controller 108 may continue processing the buffered intermediate video format frames 106 according to the first video processing mode until that queue is exhausted, and then switch to the second video processing mode to begin processing any queued display frames 110 which are being processed according to the second video processing mode. Similarly, frames may be in the progress of being processed and buffered according to the second mode when the apparatus 100 switches to the first mode. Thus, in at least some embodiments, when switching modes between frames as shown in FIG. 4, the apparatus controller may indicate to the display controller 108 at which frame boundary the display controller 108 is to switch modes. Alternatively, the display controller 108 may detect that a queue of buffered frames being rendered for display according to one of the two modes has been exhausted, check a queue for the other mode to determine if any frames are ready in that queue, and if so switch to the appropriate mode and begin processing the frames.

Mode Switching Alternatives

FIGS. 3 and 4 generally describe that the apparatus controller switches the video processing mode from the first mode to the second mode in response to detecting that other graphical input is to be composited with the video frames being processed for display, and switching the video processing mode from the second mode to the first mode when the video frames can be rendered without compositing with other graphical input. However, in at least some embodiments, other events or conditions may cause the apparatus controller to switch modes. For example, as noted, the first video processing mode as illustrated in FIG. 1A may use less power than the second mode as illustrated in FIG. 1B. Thus, in at least some embodiments, the apparatus 100 may switch from the second video processing mode to the first video processing mode upon detecting that power (e.g., a battery of the computing device) needs to be conserved, or upon detecting that the computing device or components thereof have been switched to a low power mode, and may switch back to the second mode upon detecting that the condition which caused the switch has been changed (e.g., that the device has been recharged, or that the device has been switched out of low power mode). Note that the visual quality of the graphics displayed in the first video processing mode may not be as good as in the second video processing mode, for example the graphics or effects of windows composited with the video window may be absent or of slightly lower quality, but in low power conditions this may be acceptable as a tradeoff to conserve power.

Example Apparatus

FIG. 5 is a generalized block diagram illustrating an example embodiment of an apparatus 1000 in which embodiments of two or more video processing modes and embodiments of a method for switching between the video processing modes may be implemented. Note that this example is not intended to be limiting. The apparatus 1000 includes multiple functional blocks or units. In some embodiments, the multiple functional units are individual dies on an integrated circuit (IC), such as a system-on-a-chip (SOC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 1000 is a SOC that includes multiple types of IC designs on a single semiconductor die, wherein each IC design provides a separate functionality. The IC designs on the apparatus 1000 may also be referred to as functional blocks on the apparatus 1000. Traditionally, each one of the types of IC designs, or functional blocks, may have been manufactured on a separate silicon wafer. In the illustrated embodiment, the apparatus 1000 includes multiple IC designs; a fabric 1030 for high-level interconnects and chip communication, a memory interface 1010, and various input/output (I/O) interfaces 1070. Clock sources, such as phase lock loops (PLLs), and a centralized control block for at least power management are not shown for ease of illustration.

The multiple IC designs within the apparatus 1000 may include various analog, digital, mixed-signal and radio-frequency (RF) blocks. For example, the apparatus 1000 may include one or more processors 1050a-1050d with a supporting cache hierarchy that includes at least cache 1052. In some embodiments, the cache 1052 may be a shared level two (L2) cache for the processors 1050a-1050d. In addition, the multiple IC designs may include a display controller 1062, a flash memory controller 1064, and a media controller 1066. Further, the multiple IC designs may include a video graphics controller 1040 and one or more processing blocks associated with real-time memory performance for display and camera subsystems, such as camera 1060.

Any real-time memory peripheral processing blocks may include image blender capability and other camera image processing capabilities as is well known in the art. The apparatus 1000 may group processing blocks associated with non-real-time memory performance, such as the media controller 1066, for image scaling, rotating, and color space conversion, accelerated video decoding for encoded movies, audio processing and so forth. The units 1060 and 1066 may include analog and digital encoders, decoders, and other signal processing blocks. In other embodiments, the apparatus 1000 may include other types of processing blocks in addition to or in place of the blocks shown.

In various embodiments, the fabric 1030 provides a top-level interconnect for the apparatus 1000. For example, connections to the cache coherence controller 1032 may exist for various requestors within the apparatus 1000. A requestor may be one of the multiple IC designs on the apparatus 1000. The cache coherence controller 1032 may provide to the multiple IC designs a consistent data value for a given data block in the shared memory, such as off-chip dynamic random access memory (DRAM). The coherence controller 1032 may use a cache coherency protocol for memory accesses to and from the memory interface 1010 and one or more caches in the multiple IC designs on the apparatus 1000. An example of a cache coherency protocol includes the MOESI protocol with the Modified (M), Owned (O), Exclusive (E), Shared (S), and Invalid (I) states.

In some embodiments, one requestor connection to the coherence controller 1032 may be provided for one or more graphics processing units (GPUs) within the video graphics controller 1040, one requestor connection for the processor cores 1050a-1050d, and one request connection for the remainder of the multiple IC designs and the I/O interface ports 1070 on the apparatus 1000. The SOC switchbar 1034 may be used to aggregate traffic from these remaining multiple IC designs.

In various embodiments, different types of traffic may flow independently through the fabric 1030. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels.

The memory interface 1010 may include one or more memory controllers and one or more memory caches for the off-chip memory, such as synchronous DRAM (SDRAM). The memory caches may be used to reduce the demands on memory bandwidth and average power consumption. In various embodiments, the memory interface 1010 includes memory controllers 1012a-1012b and memory caches 1014a-1014b. In some embodiments, bus traffic may be routed through two symmetric bus classes, such as a left bus class and a right bus class. Therefore, two memory controllers 1012a-1012b and two memory caches 1014a-1014b may be used. Although two memory controllers 1012a-1012b and two caches 1014a-1014b are shown, in various other embodiments a single memory controller and a single memory cache may be used.

As shown, in some embodiments, the memory controllers 1012a-1012b may not be a coherency point within the apparatus 1000 as they are separate from the coherence controller 1032. This separation may allow an associated system level memory cache, such as caches 1014a-1014b, to be inserted in the path to memory. The memory caches 1014a-1014b may be logically located between the coherence controller 1032 and the memory controllers 1012a-1012b. Additionally, the memory caches 1014a-1014b may not participate in a cache coherency protocol. In other embodiments, the memory interface 1010 may include a directory-based coherency protocol causing the coherency point may be located within the memory interface 1010. In such embodiments, the memory caches 1014a-1014b may participate in the cache coherency protocol.

The memory caches 1014a-1014b may be used by each one of the multiple IC designs on the apparatus 1000. The allocation policy for the memory caches 1014a-1014b may be programmable. The memory caches 1014a-1014b may also be used in a synchronous RAM (SRAM) mode for system boot and system debug. One or more memory channels 1020a-1020d may be connected to the memory interface 1010.

The caches 1014a-1014b may store one or more blocks, each of which is a copy of data stored at a corresponding address in the system memory. As used herein, a "block" is a set of bytes stored in contiguous memory locations, which are treated as a unit for coherency purposes although the caches 1014a-1014b may not participate in the cache coherency protocol. As used herein, the terms "cache block", "block", "cache line", and "line" are interchangeable. The number of bytes in a block may be varied according to design choice, and may be of any size. As an example, 64 byte blocks may be used.

Each of the memory channels 1020a-1020d may be a separate interface to a memory, such as SDRAM. The memory controllers 1012a-1012b may include request queues for queuing memory requests. The memory controllers 1012a-1012b may also include logic for supporting a given protocol used to interface to the memory channels 1020-1020d. The protocol may determine values used for information transfer, such as a number of data transfers per clock cycle, signal voltage levels, signal timings, signal and clock phases and clock frequencies. Protocol examples include DDR2 (Double Data Rate, version 2) SDRAM, DDR3 SDRAM, GDDR4 (Graphics Double Data Rate, version 4) SDRAM, and GDDR5 (Graphics Double Data Rate, version 5) SDRAM.

The interface between the combination of the memory interface 1010 and the coherency controller 1032 and the remainder of the apparatus 1000, which includes the multiple IC designs and the switch bars 1034 and 1036, includes multiple buses. Asynchronous memory requests, responses, snoops, snoop responses, and input/output (I/O) transactions are visible at this interface with temporal relationships.

The display controller 1062 sends graphics output information that was rendered to one or more display devices. The rendering of the information may be performed by the display controller 1062, by the video graphics controller 1040, or by both controllers 1062 and 1040. Alternatively, the display controller 1062 may send graphics output information to the video graphics controller 1040 to be output to one or more display devices. The graphics output information may correspond to frame buffers accessed via a memory mapping to the memory space of a GPU within the video graphics controller 1040. The memory mappings may be stored and updated in address translators. The frame data may be for an image to be presented on a display. The frame data may include at least color values for each pixel on the screen. The frame data may be read from the frame buffers stored in the off-die SDRAM or the on-die caches 1014a-1014b.

The display controller 1062 may include one or more display pipelines. Each display pipeline may send rendered graphical information to a separate display. For example, a display panel internal to a computing device that includes the apparatus 1000 may be used. Additionally, a network-connected display may also be supported. Each display pipeline within the display controller 1062 associated with a separate display screen may include one or more internal pixel-processing pipelines.

Each one of the processors 1050a-1050d may include one or more cores and one or more levels of a cache memory subsystem. Each core may support the out-of-order execution of one or more threads of a software process and include a multi-stage pipeline. Each one of the processors 1050a-1050d may include circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture may be selected.

Generally, the processors 1050a-1050d may include multiple on-die levels (L1, L2, L3 and so forth) of caches for accessing data and instructions. If a requested block is not found in the on-die caches or in the off-die cache 1052, then a read request for the missing block may be generated and transmitted to the memory interface 1010 or to on-die flash memory (not shown) controlled by the flash controller 1064. The flash memory may be a non-volatile memory block formed from an array of flash memory cells. Alternatively, the memory 1050 may include other non-volatile memory technology. The bus interface unit (BIU) 1054 may provide memory access requests and responses for at least the processors 1050a-1050d.

The processors 1050a-1050d may share the on-chip flash memory and the off-chip DRAM accessed through the memory interface 1010 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources. The coherence controller 1032 in the fabric 1030 may manage memory coherence.

Other processor cores on apparatus 1000 may not include a mirrored silicon image of processors 1050a-1050d. These other processing blocks may have a micro-architecture different from the micro-architecture used by the processors 1050a-1050d. For example, other processors may have a micro-architecture that provides high instruction throughput for a computational intensive task, such as a single instruction multiple data (SIMD) core. Examples of SIMD cores include graphics processing units (GPUs), digital signal processing (DSP) cores, or other. For example, the video graphics controller 1040 may include one or more GPUs for rendering graphics for games, user interface (UI) effects, and other applications.

The apparatus 1000 may include processing blocks for real-time memory performance, such as the camera 1060 and the display controller 1062, as described earlier. In addition, the apparatus 1000 may including processing blocks for non-real-time memory performance for image scaling, rotating, and color space conversion, accelerated video decoding for encoded movies, audio processing and so forth. The media controller 1066 is one example. The I/O interface ports 1070 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Example Computing Device

Figure 6:
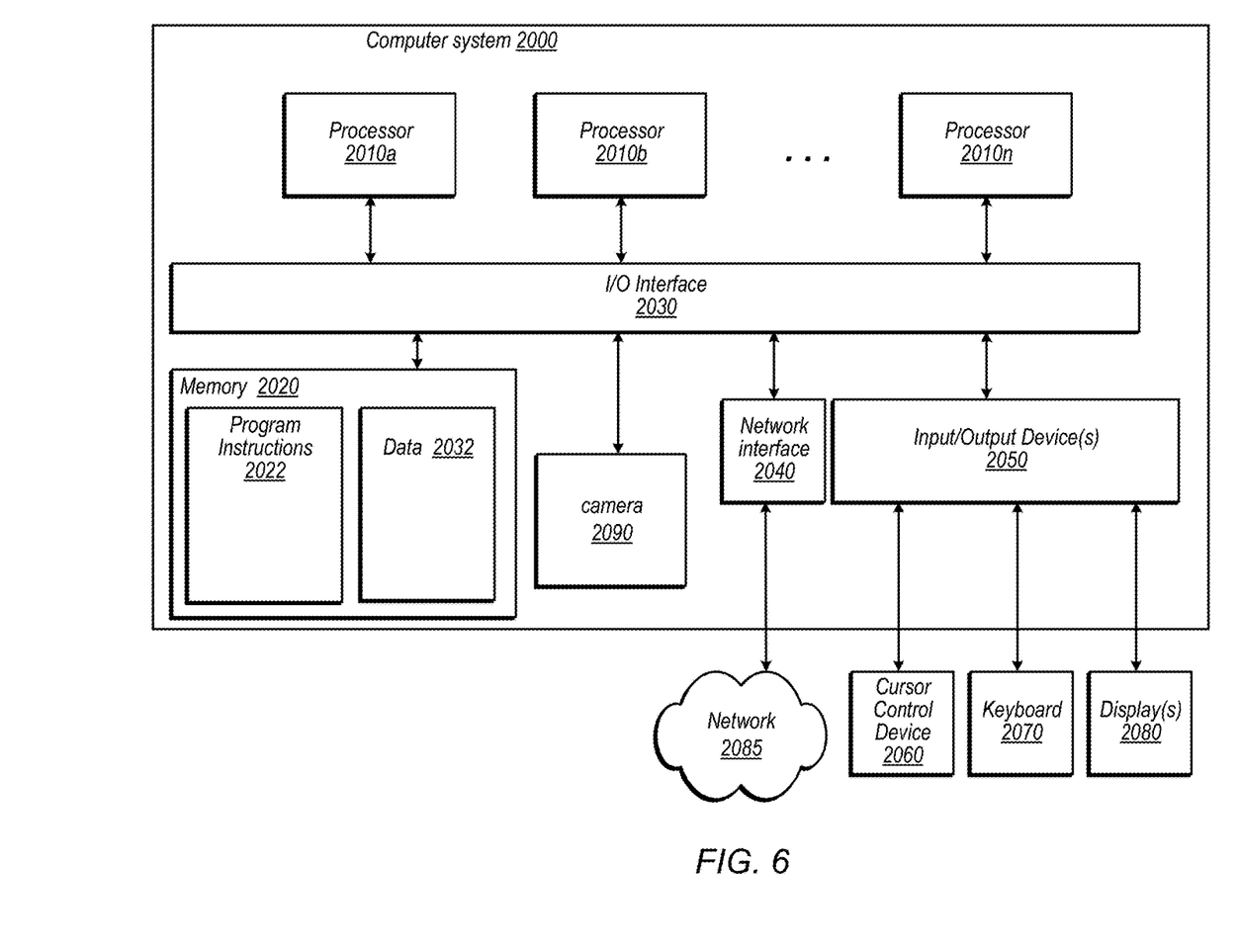
FIG. 6 illustrates an example computer system that may be used in embodiments.

FIG. 6 illustrates an example computing device, referred to as computer system 2000, that may include or host embodiments of an apparatus implementing embodiments of multiple video processing modes and embodiments of a method for switching between video processing modes, for example as illustrated in FIGS. 1 through 5. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, which may also be coupled to I/O interface 2030. At least one of cameras 2090 may be operable to capture video sequences.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data (e.g., drivers) for controlling operations of an apparatus implementing embodiments of multiple video processing modes and embodiments of a method for switching between video processing modes, for example as illustrated in FIGS. 1 through 5. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 6, memory 2020 may include program instructions 2022, which may be processor-executable to implement any element or action to support operations of an apparatus implementing embodiments of multiple video processing modes and embodiments of a method for switching between video processing modes, for example as illustrated in FIGS. 1 through 5. In at least some embodiments, images or video captured by a camera 2090 may be stored to memory 2020. In addition, metadata for images or video captured by a camera 2090 may be stored to memory 2020. Video streams stored to memory 2020 may, for example, be processed by embodiments of an apparatus implementing embodiments of multiple video processing modes and embodiments of a method for switching between video processing modes, for example as illustrated in FIGS. 1 through 5. Alternatively, video streams captured by a camera 2090 may be passed directly to an embodiment of an apparatus as illustrated in FIG. 5 without first storing the video stream to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    a plurality of functional blocks configured to process video frames from a video stream and to store the processed video frames as frame data in a memory to be read and processed by a display controller for display to a display device;
    wherein the apparatus is configured to process the video frames for display according to two or more video processing modes, wherein, to process the video frames according to the two or more video processing modes, the apparatus is configured to:
        direct the plurality of functional blocks and the display controller to process video frames for display according to one of the two or more video processing modes;
        process and display one or more video frames according to the video processing mode;
        determine that a next video frame is to be processed and displayed according to another one of the two or more video processing modes;
        in response to said determining, direct the plurality of functional blocks and the display controller to process video frames according to the other video processing mode; and
        process and display one or more subsequent video frames according to the other video processing mode;
    wherein the two or more video modes include:
        a first video processing mode in which the functional blocks are configured to convert the video frames to an intermediate video format and store the converted video frames as frame data in the intermediate video format, and in which the display controller is configured to process the frame data in the intermediate video format to generate display frames in a display format of the display device for display to the display device; and
        a second video processing mode in which the functional blocks are configured to process the video frames to generate display frames in the display format of the display device, and in which the display controller is configured to read the display frames from the memory for display to the display device.

2. The apparatus as recited in claim 1, wherein, in the first video processing mode, one or more of the functional blocks are configured to decode the video frames received in a raw video format to generate the video frames in the intermediate video format.

3. The apparatus as recited in claim 2, wherein the raw video format is YUV420 format, and wherein the intermediate video format is YUV422 format.

4. The apparatus as recited in claim 1, wherein, in the first video processing mode, the display controller is configured to:
    read the video frames in the intermediate video format from the memory;
    convert the video frames from the intermediate video format to the display format of the display device and scale the video frames to an appropriate size for display;
    composite each converted and scaled video frame with other graphical information to generate display frames to be displayed the display device; and
    output the display frames to the display device.

5. The apparatus as recited in claim 1, wherein, in the second video processing mode, one or more of the functional blocks are configured to:
    decode the video frames received in a raw video format to generate video frames in the intermediate video format;
    convert the video frames from the intermediate video format to the display format of the display device to generate video frame windows in a format used by the display device;
    composite each video frame window with one or more other windows each including other graphical information to be displayed to the display device to generate the display frames in the display format of the display device; and
    store the display frames in the memory to be read and processed by the display controller for display to the display device.

6. The apparatus as recited in claim 1, wherein the display format is RGB format.

7. The apparatus as recited in claim 1, wherein, in the second video processing mode, the functional blocks are further configured to scale each video frame to an appropriate size for display.

8. The apparatus as recited in claim 1, wherein, in the second video processing mode, the display controller is configured to:
    read the display frames from the memory;
    if additional processing is needed for the display frames, perform the additional processing; and
    output the display frames to the display device.

9. The apparatus as recited in claim 1, wherein, to determine that a next video frame is to be processed and displayed according to another one of the two or more video processing modes, the apparatus is configured to determine that graphical input is to be composited with at least the next video frame, wherein the other video processing mode is the second video processing mode, and wherein in the second video processing mode the functional blocks are configured to composite graphical input with video frames prior to storing the processed video frames as display frames in the memory to be read and processed by the display controller for display to the display device.

10. The apparatus as recited in claim 1, wherein, to determine that a next video frame is to be processed and displayed according to another one of the two or more video processing modes, the apparatus is configured to determine that at least the next video frame does not require compositing with other graphical input, wherein the other video processing mode is the first video processing mode, and wherein in the first video processing mode the functional blocks are configured to decode the video frames to generate video frames in the intermediate video format and store the video frames in the intermediate video format as frame data in the memory to be read and processed by the display controller for display to the display device.

11. The apparatus as recited in claim 1, wherein the apparatus is one of an integrated circuit (IC), a system-on-a-chip (SOC), or a multi-chip module (MCM).

12. A method, comprising:
  directing one or more functional blocks and a display controller of an apparatus to process video frames for display according to one of two or more video processing modes;
  processing and displaying one or more video frames according to the video processing mode;
  determining that a next video frame is to be processed and displayed according to another one of the two or more video processing modes;
  in response to said determining, directing the one or more functional blocks and the display controller of the apparatus to process video frames according to the other video processing mode; and
  processing and displaying one or more subsequent video frames according to the other video processing mode;
  wherein the two or more video modes include a first video processing mode comprising:
    converting, by the functional blocks, the video frames to an intermediate video format; and
    processing, by the display controller, the video frames in the intermediate video format to generate display frames in a display format of a display device;
  wherein the two or more video modes further include a second video processing mode comprising:
    processing, by the functional blocks, the video frames to generate display frames in the display format of the display device; and
    receiving, by the display controller, the display frames in the display format of the display device from the functional blocks.

13. The method as recited in claim 12, wherein converting, by the functional blocks, the video frames to an intermediate video format comprises:
  decoding the video frames received in a raw video format to generate the video frames in the intermediate video format; and
  providing the video frames in the intermediate video format to the display controller for processing and display to the display device.

14. The method as recited in claim 13, wherein processing, by the functional blocks, the video frames to generate display frames in the display format of the display device comprises:
  decoding the video frames received in the raw video format to generate video frames in the intermediate video format;
  converting the video frames from the intermediate video format to the display format of the display device to generate video frame windows in a format used by the display device;
  compositing each video frame window with one or more other windows each including other graphical information to be displayed to the display device; and
  providing the composited windows to the display controller for display to the display device.

15. The method as recited in claim 12, wherein said determining that a next video frame is to be processed and displayed according to another one of the two or more video processing modes comprises one of:
  determining that graphical input is to be composited with at least the next video frame, wherein the other video processing mode is the second video processing mode, and wherein in the second video processing mode the functional blocks composite graphical input with video frames prior to providing the processed video frames to the display controller; or
  determining that at least the next video frame does not require compositing with other graphical input, wherein the other video processing mode is the first video processing mode, and wherein in the second video processing mode the functional blocks decode the video frames to generate video frames in an intermediate video format and provide the video frames in the intermediate video format to the display controller.

16. A device, comprising:
  a memory;
  a display screen; and
  an apparatus comprising a plurality of functional blocks configured to process video frames from a video stream and to store the processed video frames as frame data to the memory to be read and processed by a display controller for display to the display screen;
  wherein the apparatus is configured to process the video frames for display according to two or more video processing modes, wherein, to process the video frames according to the two or more video processing modes, the apparatus is configured to:
    direct the plurality of functional blocks and the display controller to process video frames for display according to one of the two or more video processing modes;
    process and display one or more video frames according to the video processing mode;
    determine that a next video frame is to be processed and displayed according to another one of the two or more video processing modes;
    in response to said determining, direct the plurality of functional blocks and the display controller to process video frames according to the other video processing mode; and
    process and display one or more subsequent video frames according to the other video processing mode;
  wherein the two or more video modes include:
    a first video processing mode in which the functional blocks are configured to convert the video frames to an intermediate video format, and in which the display controller is configured to process the video frames in the intermediate video format to generate display frames in a display format of the display screen; and
    a second video processing mode in which the functional blocks are configured to process the video frames to generate display frames in the display format of the display screen, and in which the display controller is configured to read the display frames in the display format of the display screen from the memory.

17. The device as recited in claim 16,
wherein, in the first video processing mode, one or more of the functional blocks are configured to:
  decode the video frames received in a raw video format to generate the video frames in the intermediate video format; and
  store the video frames in the intermediate video format as frame data in the memory to be read and processed by the display controller for display to the display screen;
wherein, in the second video processing mode, one or more of the functional blocks are configured to:
  decode the video frames received in the raw video format to generate video frames in the intermediate video format;
  convert the video frames from the intermediate video format to the display format of the display screen to generate video frame windows in a format used by the display screen;
  composite each video frame window with one or more other windows each including graphical information to be displayed to the display screen; and
  store the composited windows as display frames in the memory to be read by the display controller for display to the display screen.

18. The device as recited in claim 17,
wherein, in the first video processing mode, the display controller is configured to:
  read the video frames in the intermediate video format from the memory;
  convert the video frames from the intermediate video format to the display format of the display screen and scale the video frames to an appropriate size for display;
  composite each converted and scaled video frame with other graphical information to generate display frames to be displayed the display screen; and
  output the display frames to the display screen;
wherein, in the second video processing mode, the display controller is configured to:
  read the composited windows stored as display frames from the memory;
  if there is additional graphical information for the display frames, combine the other graphical information with the display frames; and
  output the display frames to the display screen.

19. The device as recited in claim 16, wherein, to determine that a next video frame is to be processed and displayed according to another one of the two or more video processing modes, the apparatus is configured to determine that graphical input is to be composited with at least the next video frame, wherein the other video processing mode is the second video processing mode, and wherein in the second video processing mode the functional blocks are configured to composite graphical input with video frames prior to storing the processed video frames as display frames in the memory to be read and processed by the display controller for display to the display screen.

20. The apparatus as recited in claim 16, wherein, to determine that a next video frame is to be processed and displayed according to another one of the two or more video processing modes, the apparatus is configured to determine that at least the next video frame does not require compositing with other graphical input, wherein the other video processing mode is the first video processing mode, and wherein in the first video processing mode the functional blocks are configured to decode the video frames to generate video frames in an intermediate video format and store the video frames in the intermediate video format as frame data in the memory to be read and processed by the display controller for display to the display screen.

* * * * *